United States Patent
Cheung et al.

(10) Patent No.: US 8,220,444 B2
(45) Date of Patent: Jul. 17, 2012

(54) SYSTEM FOR IMPROVING THE EFFICIENCY OF AN INTERNAL COMBUSTION ENGINE OF A VEHICLE

(75) Inventors: Chiu Hon Cheung, Hong Kong (HK); Michael Kwok Lau Cheung, Hong Kong (HK)

(73) Assignee: Mackson Limited, Hong Kong (HK)

(*) Notice: Subject to any disclaimer, the term of this patent is extended or adjusted under 35 U.S.C. 154(b) by 414 days.

(21) Appl. No.: 12/472,713

(22) Filed: May 27, 2009

(65) Prior Publication Data

US 2010/0300392 A1    Dec. 2, 2010

(51) Int. Cl.
*F02M 29/06* (2006.01)
(52) U.S. Cl. ......................... 123/590; 123/306
(58) Field of Classification Search ................. 123/306, 123/590, 592; 48/189.4
See application file for complete search history.

(56) References Cited

U.S. PATENT DOCUMENTS

| | | | | |
|---|---|---|---|---|
| 1,514,132 A * | 11/1924 | Cortelyou | ..................... | 48/189.6 |
| 2,017,043 A * | 10/1935 | Galliot | ............................. | 138/40 |
| 2,685,504 A * | 8/1954 | Ulbing | ......................... | 48/189.4 |
| 4,088,104 A * | 5/1978 | Ibbott | ........................... | 48/189.4 |
| 4,515,138 A * | 5/1985 | Agadi | ............................ | 123/590 |
| 5,113,838 A * | 5/1992 | Kim | ................................ | 123/592 |
| D355,420 S * | 2/1995 | Cho | .................................. | D15/5 |
| 5,947,081 A * | 9/1999 | Kim | ................................ | 123/306 |
| D469,781 S * | 2/2003 | Kim | .................................. | D15/5 |
| 7,028,663 B1 * | 4/2006 | Kim | ................................ | 123/306 |
| 7,055,512 B2 * | 6/2006 | Leuenberger | ................. | 123/590 |
| 7,267,098 B1 * | 9/2007 | Tasanont | ....................... | 123/306 |
| 7,543,561 B2 * | 6/2009 | Shibata et al. | ................ | 123/306 |
| 7,552,723 B1 * | 6/2009 | Ugalde | ......................... | 123/592 |
| 7,690,349 B2 * | 4/2010 | Bolanos | ........................ | 123/306 |
| 7,797,937 B2 * | 9/2010 | Endicott et al. | .............. | 60/605.1 |
| 2003/0226539 A1 * | 12/2003 | Kim | ............................... | 123/306 |
| 2007/0169764 A1 * | 7/2007 | Lo | ................................. | 123/592 |
| 2007/0266989 A1 * | 11/2007 | Yang | ............................. | 123/306 |

* cited by examiner

*Primary Examiner* — Erick Solis
(74) *Attorney, Agent, or Firm* — Kauth, Pomeroy, Peck & Bailey LLP (57) ABSTRACT

A system for improving the efficiency of an internal combustion engine of a vehicle, the system comprising: a first non-rotating device (10) positioned within an air intake manifold upstream from a throttle chamber of the engine; and a second non-rotating device (20) positioned within an exhaust manifold of the vehicle; wherein the first and second devices (10, 20) include: a tubular housing (11, 21) having an entrance end portion (15) and an exit end portion (16), the housing (11, 21) being of a size to direct the flow of air through the air intake manifold or the exhaust manifold from the entrance end portion (15) to the exit end portion (16); a plurality of longitudinal fins (12, 22) arranged within the housing (11, 21) extending from the entrance end portion towards the exit end portion (15, 16), the fins (12, 22) having a curved profile to generate a spiral airflow such that a differential air pressure is created to accelerate the rate of airflow through the vehicle.

13 Claims, 13 Drawing Sheets

Air Flow Direction

SYSTEM FOR IMPROVING THE EFFICIENCY OF AN INTERNAL COMBUSTION ENGINE OF A VEHICLE

TECHNICAL FIELD

The invention concerns a system and method for improving the efficiency of an internal combustion engine of a vehicle.

BACKGROUND OF THE INVENTION

Increasing airflow into an engine of a vehicle usually increases its efficiency. Traditionally, turbo charging or super charging is used to increase airflow into an engine. However, modifying a vehicle to be turbo charged or super charged is expensive because they are relatively complex systems to install which requires existing manifolds to be modified also. Also, a skilled mechanic for installation of these systems is required.

SUMMARY OF THE INVENTION

In a first preferred aspect, there is provided a system for improving the efficiency of an internal combustion engine of a vehicle. The system includes a first non-rotating device positioned within an air intake manifold upstream from a throttle chamber of the engine. The system also includes a second non-rotating device positioned within an exhaust manifold of the vehicle. The first and second devices include a tubular housing having an entrance end portion and an exit end portion, the housing being of a size to direct the flow of air through the air intake manifold or the exhaust manifold from the entrance end portion to the exit end portion. The first and second devices also include a plurality of longitudinal fins arranged within the housing extending from the entrance end portion towards the exit end portion, the fins having a curved profile to generate a spiral airflow such that a differential air pressure is created to accelerate the rate of airflow through the vehicle.

The entrance end portion of the first device may have a larger cross sectional area than the exit end portion.

Each fin may be twisted into a helical shape.

The fins may be spaced apart at 60° from each other.

There may be six fins within each device.

A top edge of each fin of the first device may be a thinner portion of the fin for generating a low-pressure vortex in the center of the first device.

The fins are magnetized.

The second device may comprise a split pin to secure the second device to the exhaust manifold.

The system may further comprise multiple second devices positioned within the exhaust manifold.

The fins may extend the entire length of the housing from the entrance end portion to the exit end portion.

In a second aspect, there is provided a method for improving the efficiency of an internal combustion engine of a vehicle. The method includes positioning a first non-rotating device within an air intake manifold upstream from a throttle chamber of the engine. The method also includes positioning a second non-rotating device within an exhaust manifold of the vehicle. The method further includes engaging the first and second devices to the inner surface of the air intake manifold and exhaust manifold, respectively. The method also includes generating a spiral airflow using the first and second devices such that a differential air pressure is created to accelerate the rate of airflow through the vehicle.

The method may further comprise buffing a top edge of each fin of the first device to be a thinner portion of the fin for generating a low pressure vortex in the center of the first device.

In a third aspect, there is provided a kit for improving the efficiency of an internal combustion engine of a vehicle. The kit includes a first non-rotating device to be positioned within an air intake manifold upstream from a throttle chamber of the engine. The kit also includes a second non-rotating device to be positioned within an exhaust manifold of the vehicle. The first and second devices include a tubular housing having an entrance end portion and an exit end portion, the housing being of a size to direct the flow of air through the air intake manifold or the exhaust manifold from the entrance end portion to the exit end portion. The first and second devices also include a plurality of longitudinal fins arranged within the housing extending from the entrance end portion towards the exit end portion, the fins having a curved profile to generate a spiral airflow such that a differential air pressure is created to accelerate the rate of airflow through the vehicle.

The devices of the system are non-movable and do not require exhausted gas or a belt to drive in contrast to turbo and super-charging devices, respectively. Installation of the system does not require any modification to the air intake pipe or the exhaust pipe.

BRIEF DESCRIPTION OF THE DRAWINGS

An example of the invention will now be described with reference to the accompanying drawings, in which.

DETAILED DESCRIPTION OF THE DRAWINGS

Referring to the drawings, a system is provided to enhance the efficiency of an internal combustion engine by utilizing a push and pull system for the intake (push) and exhaust (pull). Using the system, the engine aspirates better and exhausts quicker to achieve its optimum operating state in less time. This leads to quicker acceleration of the vehicle. Also, the vehicle uses less fuel if the acceleration rate remains the same the previous/benchmark acceleration rate.

The system comprises two devices 10, 20. The devices 10, 20 have a tubular housing 11, 21 and are hollow. A set of fins 12, 22 project inwardly from the inner wall of the tubular housing 11, 21. The fins 12, 22 are limited in their height such that a central portion 14, 24 of the devices 10, 20 are unobstructed by the fins 12, 22. The fins and housing of the devices 10, 20 may be made from stainless steel. There are no rotating parts for the devices 10, 20. A first non-rotating device 10 is positioned within an air intake manifold upstream to improve aspiration. The first device 10 is placed inside the air intake manifold before the throttle of the engine. A second non-rotating device 20 is positioned within an exhaust manifold to improve exhaustion. The second device 20 is placed at the exit of the exhaust after the silencer and before the exit tip of the exhaust manifold. The closer the second device 20 is placed to the silencer, the better it performs. More than one second device 20 may be installed in the same exhaust manifold to increase the efficiency of the vehicle.

Figure 1:
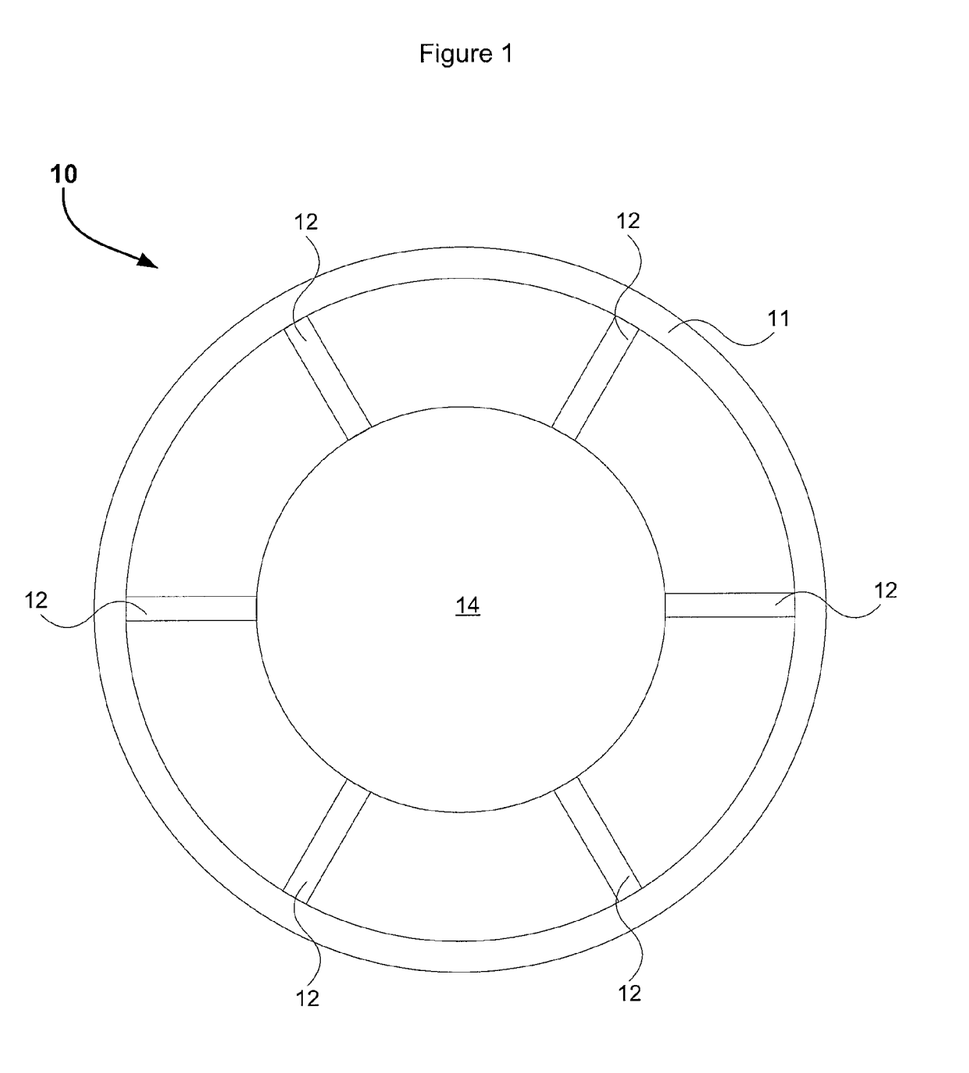
FIG. 1 is a front view of a non-rotating device positioned within an air intake manifold upstream according to a first embodiment of the present invention.
Figure 2:
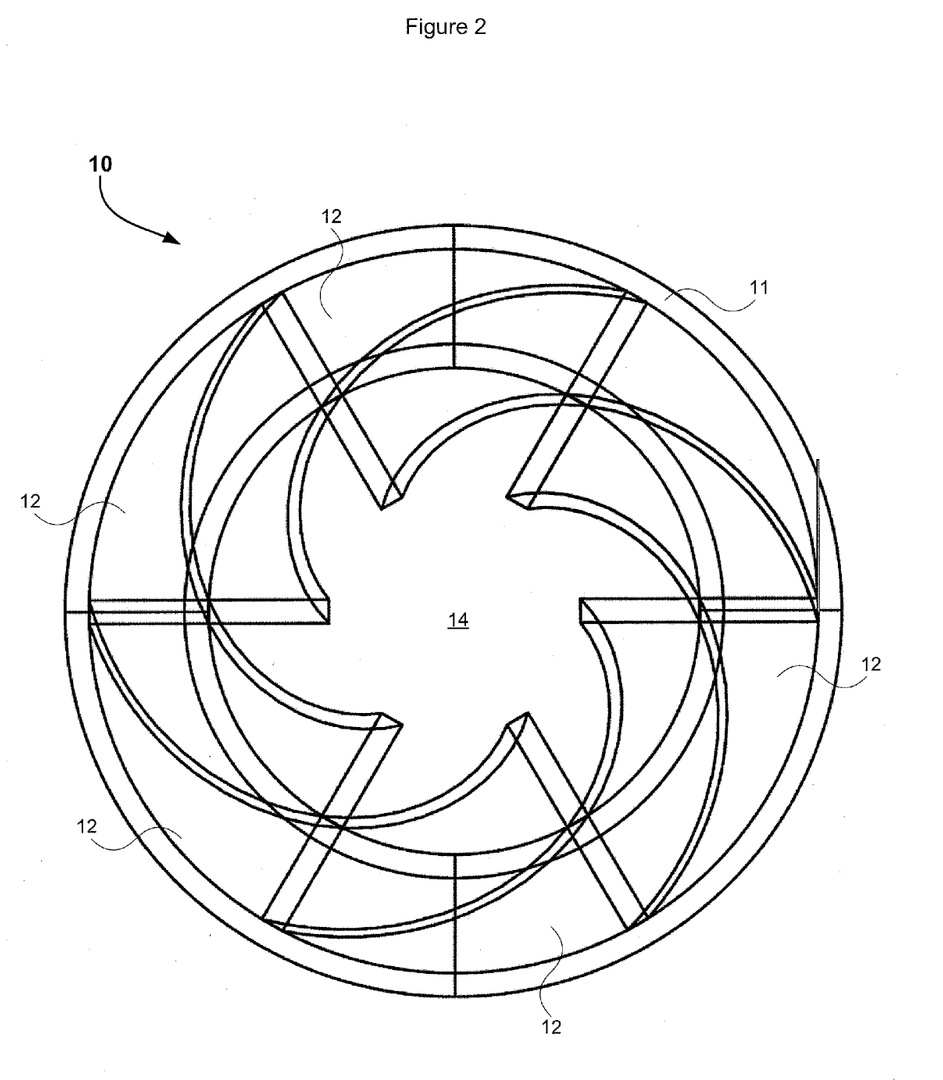
FIG. 2 is a wire frame front view of the device of FIG. 1.
Figure 3:
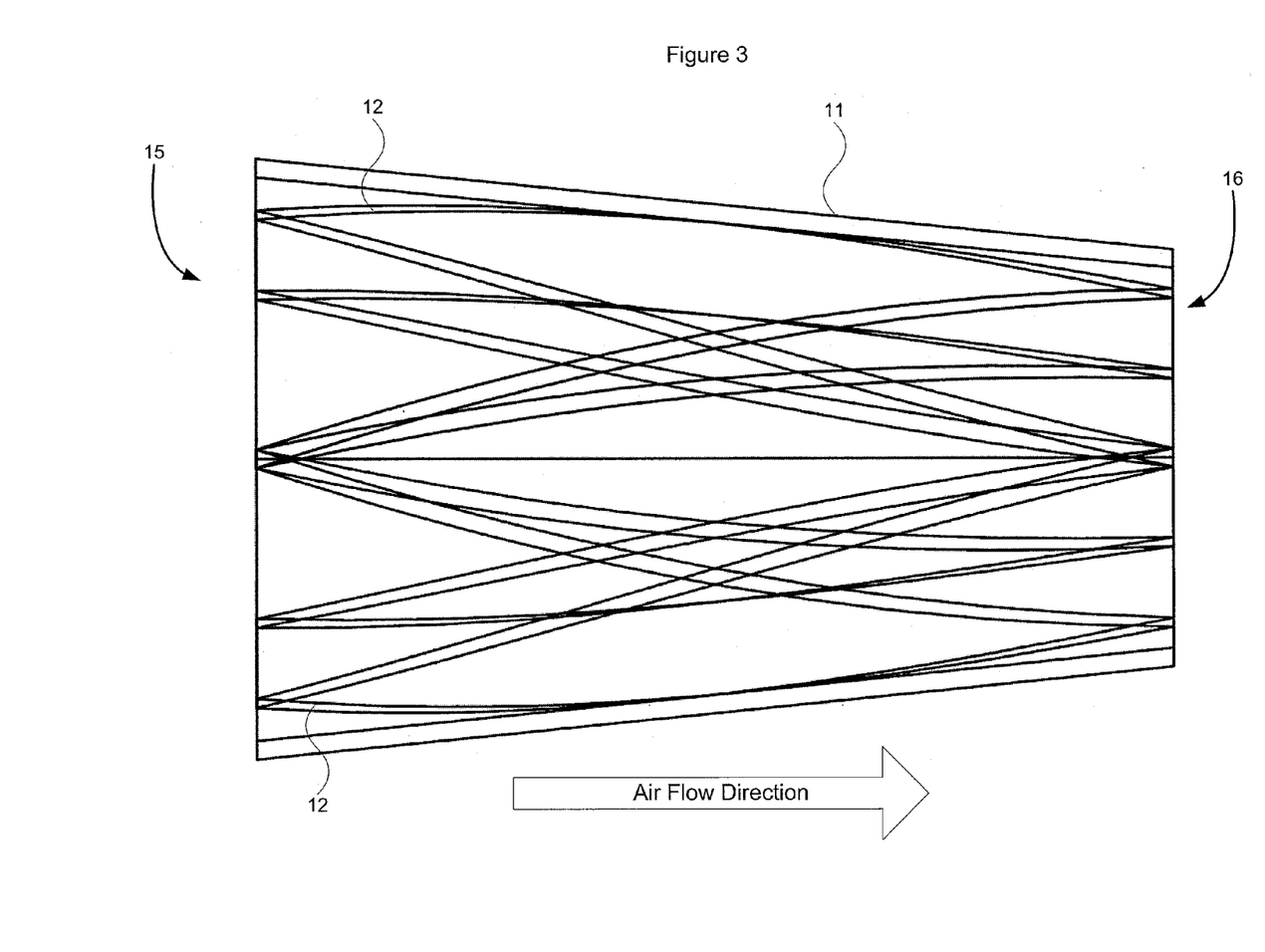
FIG. 3 is a wire frame side view of the device of FIG. 1.
Figure 4:
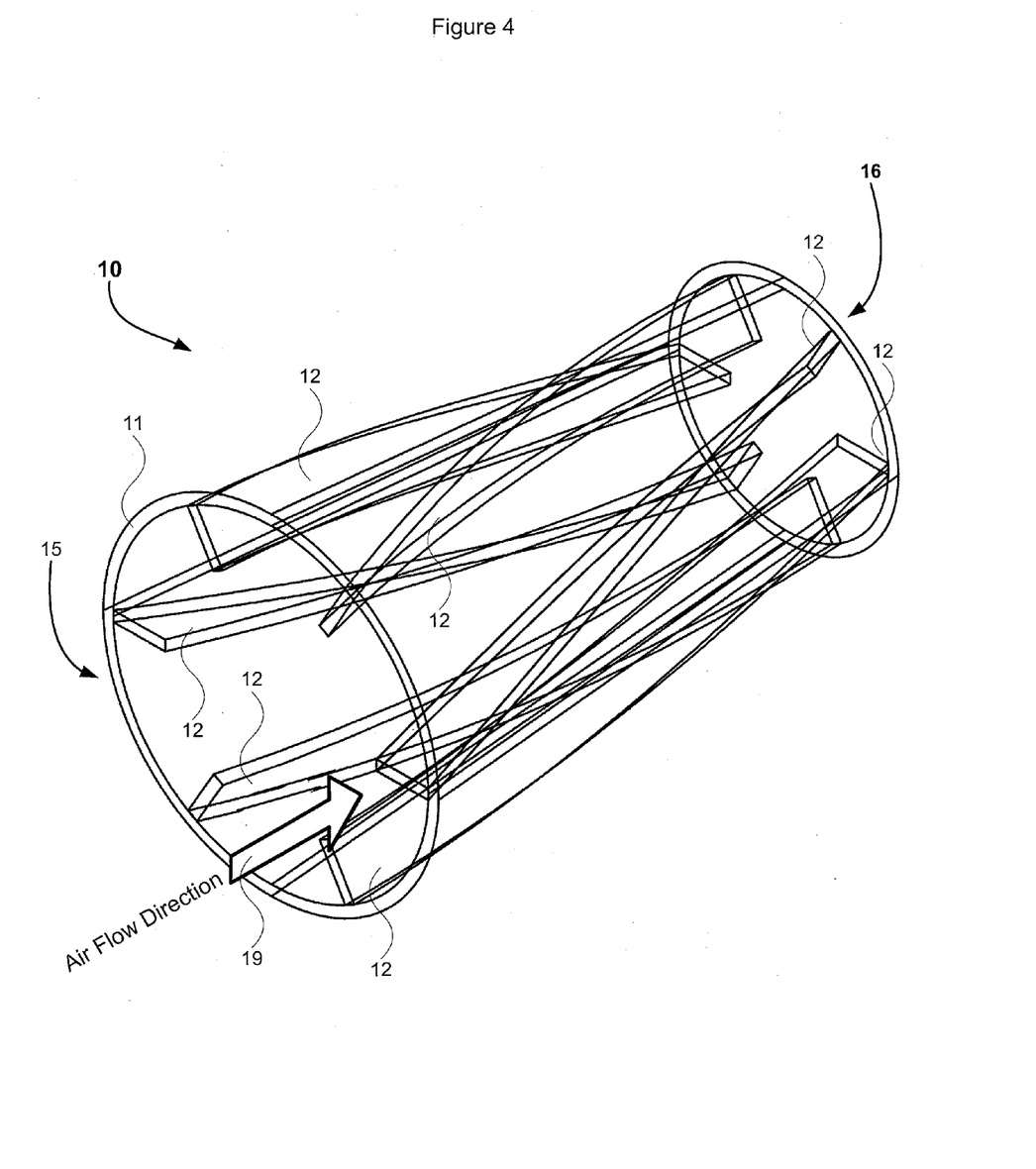
FIG. 4 is a wire frame perspective view of the device of FIG. 1.
Figure 5:
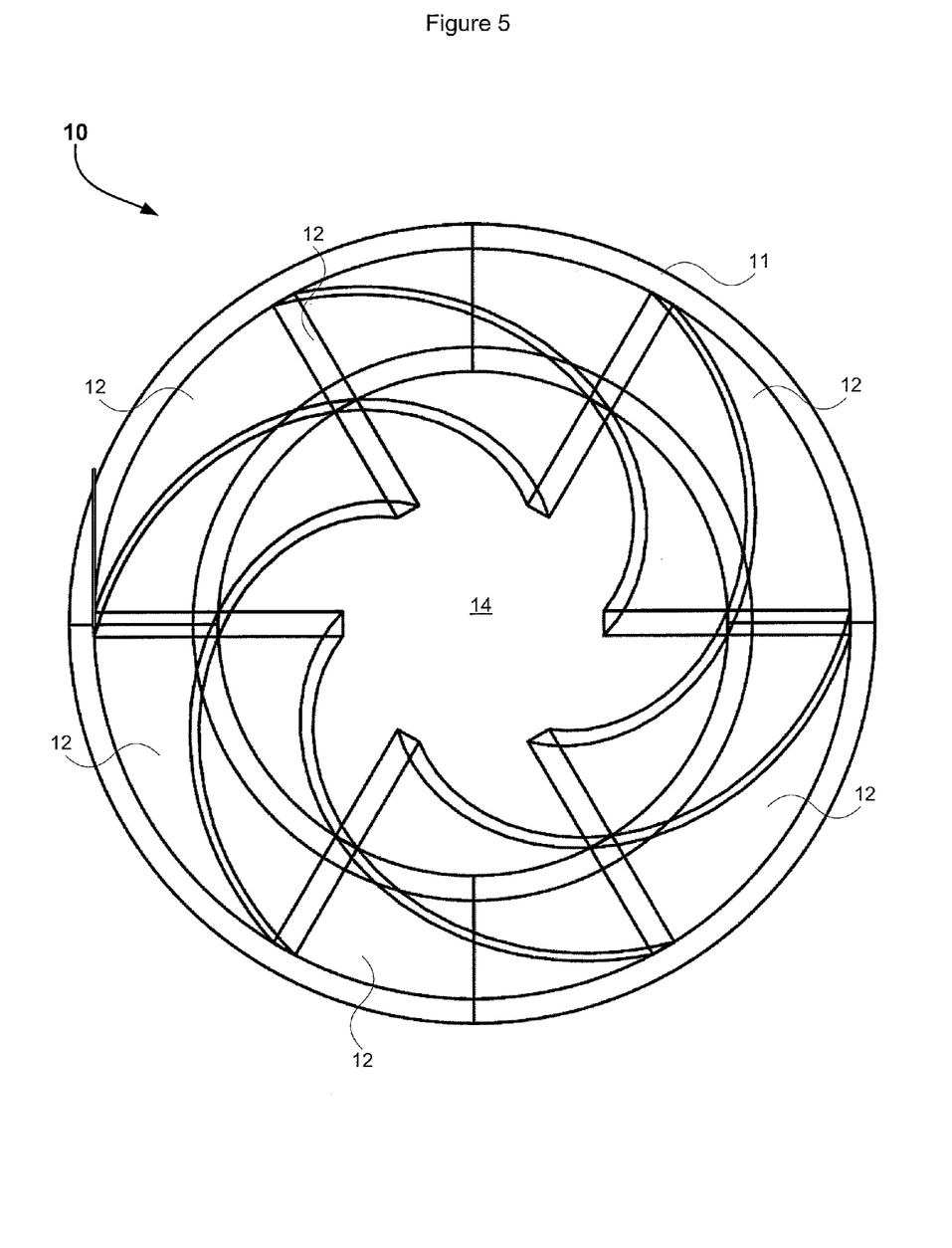
FIG. 5 is a wire frame rear view of the device of FIG. 1.

Turning to FIGS. 1 to 5, the first device 10 is inserted and fixed within the air intake tube/air intake manifold. Usually the air intake tube is made from rubber and makes it is easy to squeeze the first device 10 into the air intake tube without cutting the air intake tube. The entrance end portion 15 of the first device 10 has a larger cross sectional area than the exit end portion 16. Typically, a ratio of 10:1 is used meaning for every 10 mm in the length of the device 10, the diameter of the device 10 is decreased by 1 mm calculated from the entrance end portion 15. In one example, for a device 10 with a length of 100 mm, the diameter of the entrance end portion 15 is 65 mm and the diameter of the exit end portion 16 is 55 mm. The first device 10 is squeezed into the intake pipe because the larger end 15 of the first device 10 is slightly wider than the diameter of the intake pipe. This prevents the first device 10 from slipping into the throttle and jamming the valve. Linear movement of the first device 10 within the air intake tube is also prevented. The position of the first device 10 should be as close to the throttle as possible but allowing some clearance for the butterfly valve of the throttle to open. Since the size of the throttle depends on the engine size, the size of the air intake tube may also vary. Therefore, the first device 10 is provided in different sizes for different engine sizes depending on the diameter of the air intake tube. However, the scale of the first device 10 remains the same.

Since engine aspiration requires some suction power generated by the engine, part of the engine power is used to suck the air into the engine. The first device 10 helps the engine aspirate better by creating a spiraled airflow as air enters and flows through the first device 10. The airflow direction 19 through the first device 10 is indicated on FIG. 4. The fins 12 cause the airflow to spiral. This spiral airflow creates a lower pressure for the air flowing within the device 10 and the air leaving the device 10 relative to the pressure of the air before it enters the device 10. Air is forced into the first device 10 because of the tendency for air pressure to equalise. Ultimately, the first device 10 causes more air to enter into the combustion chamber of the engine and provides better combustion. An airflow meter is used to verify the air pressure differential. The airflow is increased by about 40% using the first device 10. To neutralise the effect of air compression, the engine is brought to around 2700 rpm. The fins 12 create a spiraled airflow which enable the engine to be lowered to 2300 rpm to achieve the same result and therefore increase fuel efficiency.

Figure 6:
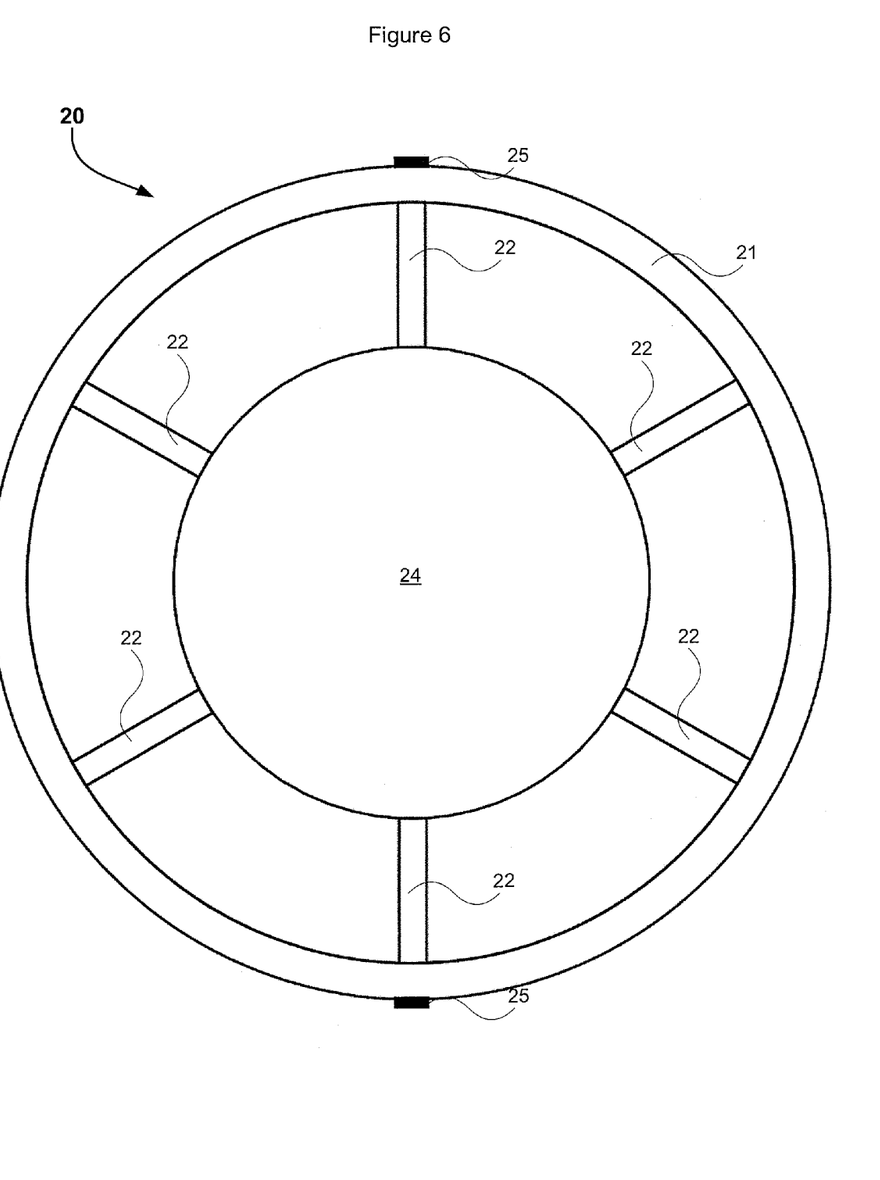
FIG. 6 is a front view of a non-rotating device positioned within an exhaust manifold according to a first embodiment of the present invention.
Figure 7:
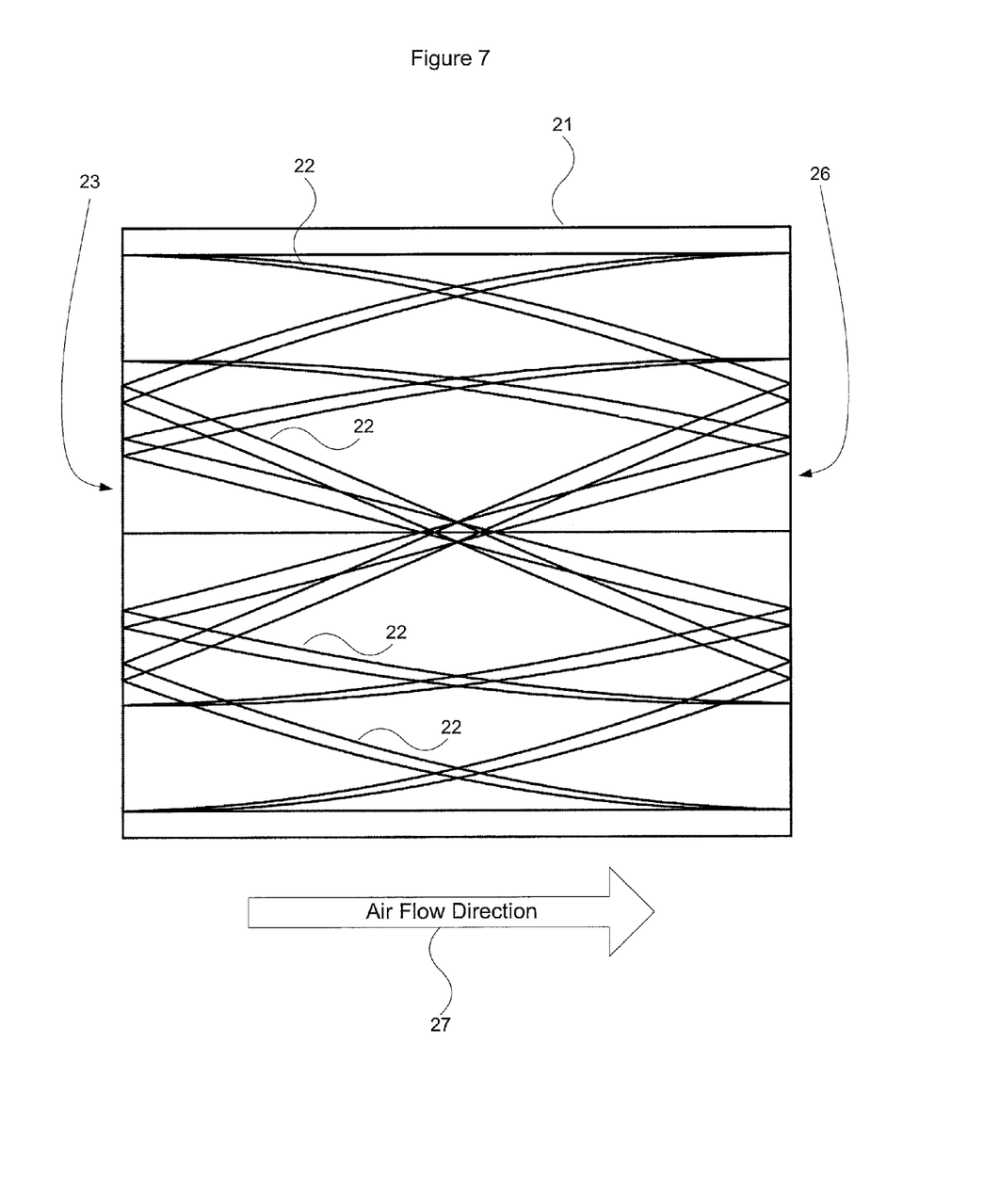
FIG. 7 is a wire frame side view of the device of FIG. 6.
Figure 8:
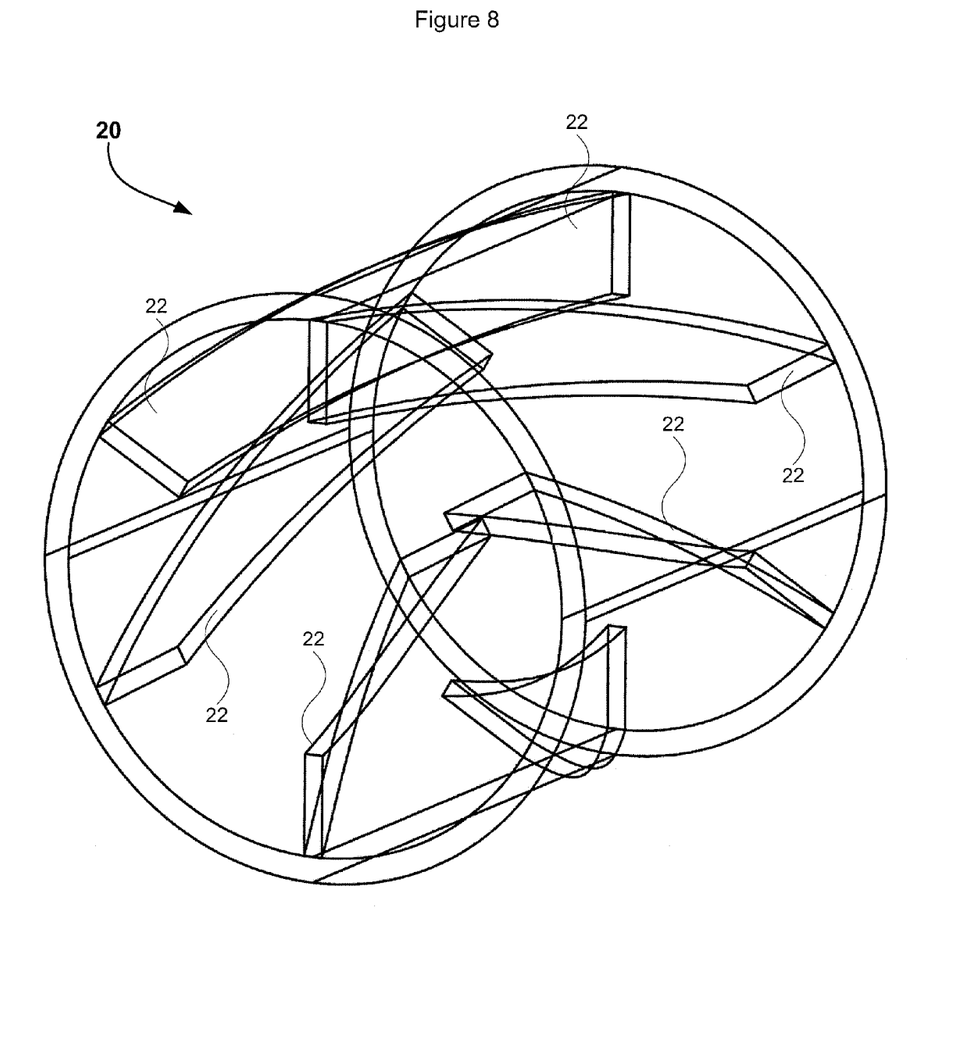
FIG. 8 is a wire frame perspective view of the device of FIG. 6.
Figure 9:
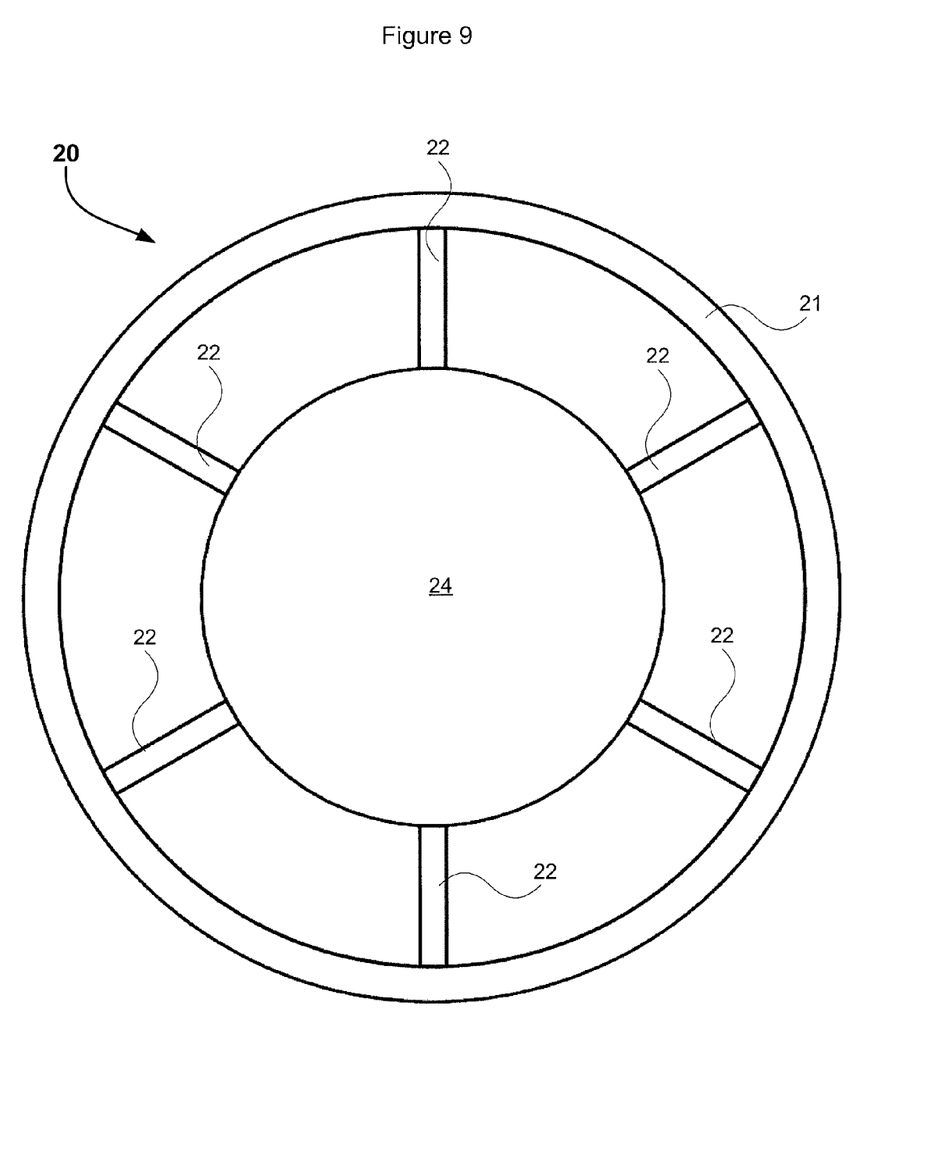
FIG. 9 is a wire frame rear view of the device of FIG. 6.

Turning to FIGS. 6 to 9, exhausted gas tends to saturate at the exit of the exhaust system of a vehicle. The second device 20 of the system helps the exhausted gas to leave the exhaust system quicker by creating a spiraled airflow for the exhausted gas. This prevents the exhausted gas from creating a back pressure to the exhaust system. The spiraled airflow creates a pressure differential causing the saturated exhausted gas to rush out of the exhaust system. Unlike the first device 10, the second device 20 does not necessarily have an entrance end portion 23 that has a larger cross sectional area than the exit end portion 26. The entrance end portion 23 may be the same size as the exit end portion 26. The airflow direction 27 through the second device 20 is indicated on FIG. 7.

Since exhaust pipes/exhaust manifolds may have different diameters, the diameter for the second device 20 can vary accordingly. To securely fit the second device 20 to the exhaust pipe, the correct diameter chosen for the second device 20 is very important to ensure the exhausted gas passes through the second device 20 rather than around it. It also is desirable to prevent linear movement of the second device 20 within the exhaust pipe. To avoid the second device 20 from slipping back out of the exhaust pipe, a split pin 25 is used. The split pin 25 clips to the wall of the second device 20 and jams it into the exhaust pipe. The split pin 25 acts as a wedge. To ensure the second device 20 cannot fall back out of the exhaust pipe, the exit end of the exhaust pipe may be pinched slightly inwards after inserting the second device 20. This causes the exit end of exhaust pipe to become narrower than the overall diameter of the second device 20 which prevents the second device 20 from falling out during use.

Any number of fins 12 may be used including four, six and eight. However, six fins is more effective than four fins while eight fins is difficult to manufacture because eight fins have to be positioned too close together in the housing 11, 12. Furthermore, the airflow is disrupted with eight fins and may actually require more engine power to suck in the air which ultimately minimizes overall efficiency gains.

The twisting of the fins 12, 22 is caused by the shape of the cylindrical formation of the first and second device 10, 20. This forces the fins 12, 22 to twist within the device 10, 20. Also, the fins 12, 22 are positioned diagonally causing the fins 12, 22 to be twisted in a helical shape. This helical shape is preferably at a 60° setting. However, a range from 30° to 120° is possible. The fins 12, 22 spiral down from the entrance end portion 15 to the next 60° mark at the exit end portion 16 of the device 10, 20. The 60° setting is selected because it reduces most of the turbulence and resonance of the airflow and therefore increases the effectiveness of the devices 10, 20.

The fins 12 for the first device 10 may be magnetized for cooperation with a system for enhancing vehicle performance disclosed in U.S. patent application Ser. No. 12/120,428 filed on 14 May 2008.

The push and pull combined system yields a quicker cycle from the intake to exhaust which means the engine uses less power to suck in fresh air and push out exhausted gas. Ultimately, the engine can use more of its generated power to propel the vehicle, hence increases the efficiency of the engine. Before installation of the system into a vehicle, the vehicles takes 10 seconds to accelerate from 0 to 100 KM/h. After installing the system into the same vehicle, the vehicle takes 7 seconds to accelerate from 0 to 100 KM/h. This constitutes a 30% improvement. On average, the mileage of the vehicle before installing the system was 8 KM for every liter of gasoline. After installing the system, the vehicle can obtain 10 KM for every liter of gasoline.

Since the system improves the mileage of the car, the fuel must combusts better than without the system installed. Therefore, less NOx is emitted which is friendlier to the environment.

In contrast to turbo and super-charged engines, the system does not require the exhausted gas or revolutions per minute (RPM) to reach an optimal operational range. Therefore, the vehicle can be slowed down like a normal vehicle. This means no need for extra braking power or excessive wear and tear of the brake pads.

Figure 10:
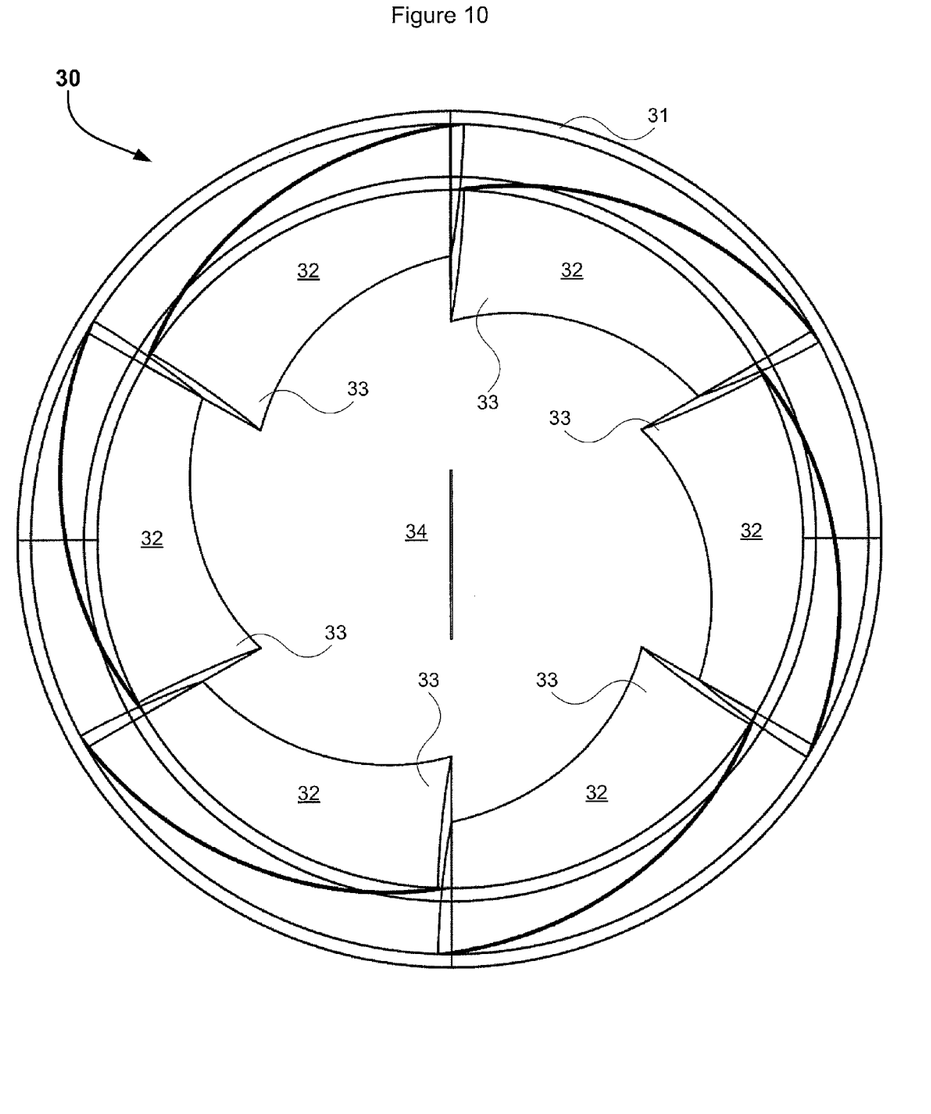
FIG. 10 is a wire frame front view of non-rotating device positioned within an air intake manifold upstream according to a second embodiment of the present invention.
Figure 11:
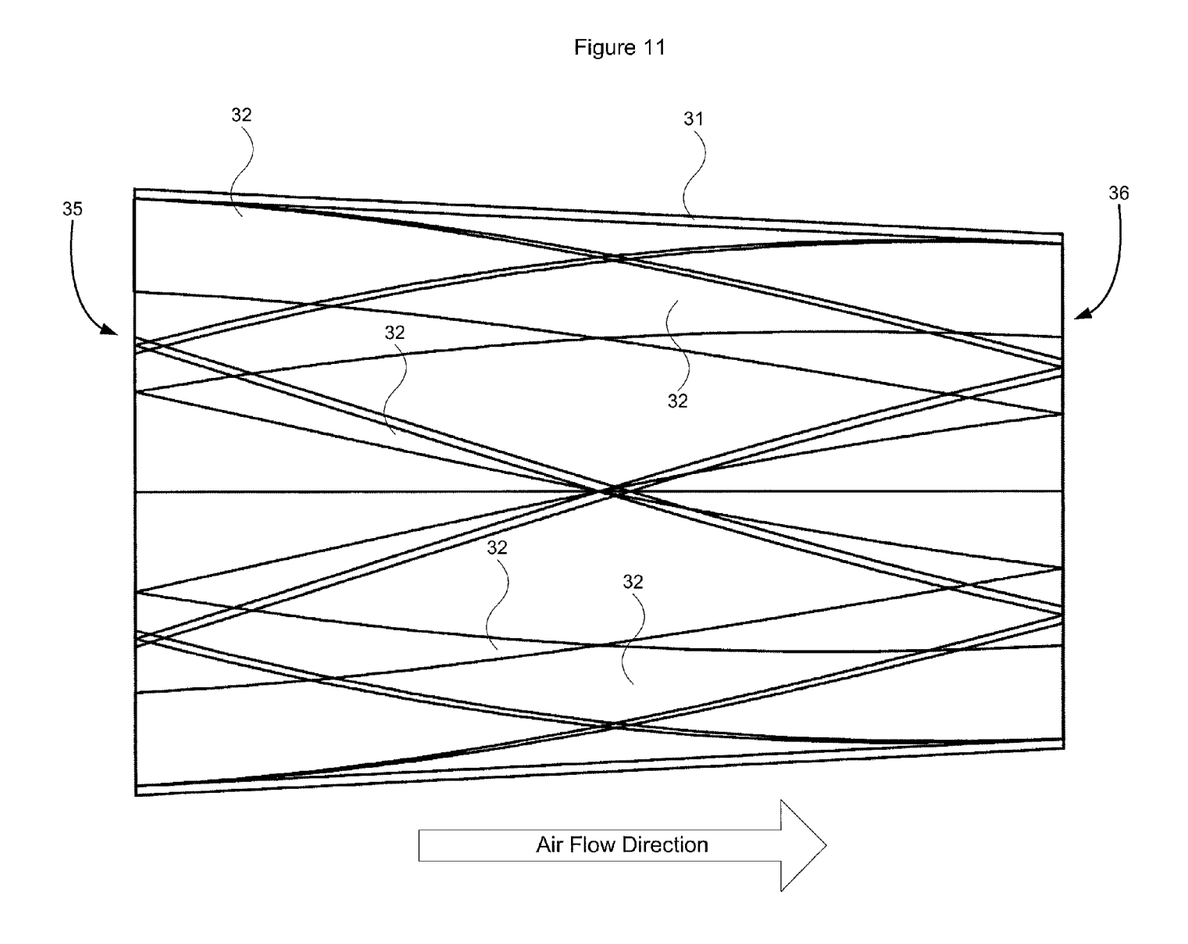
FIG. 11 is a wire frame side view of the device of FIG. 10.
Figure 12:
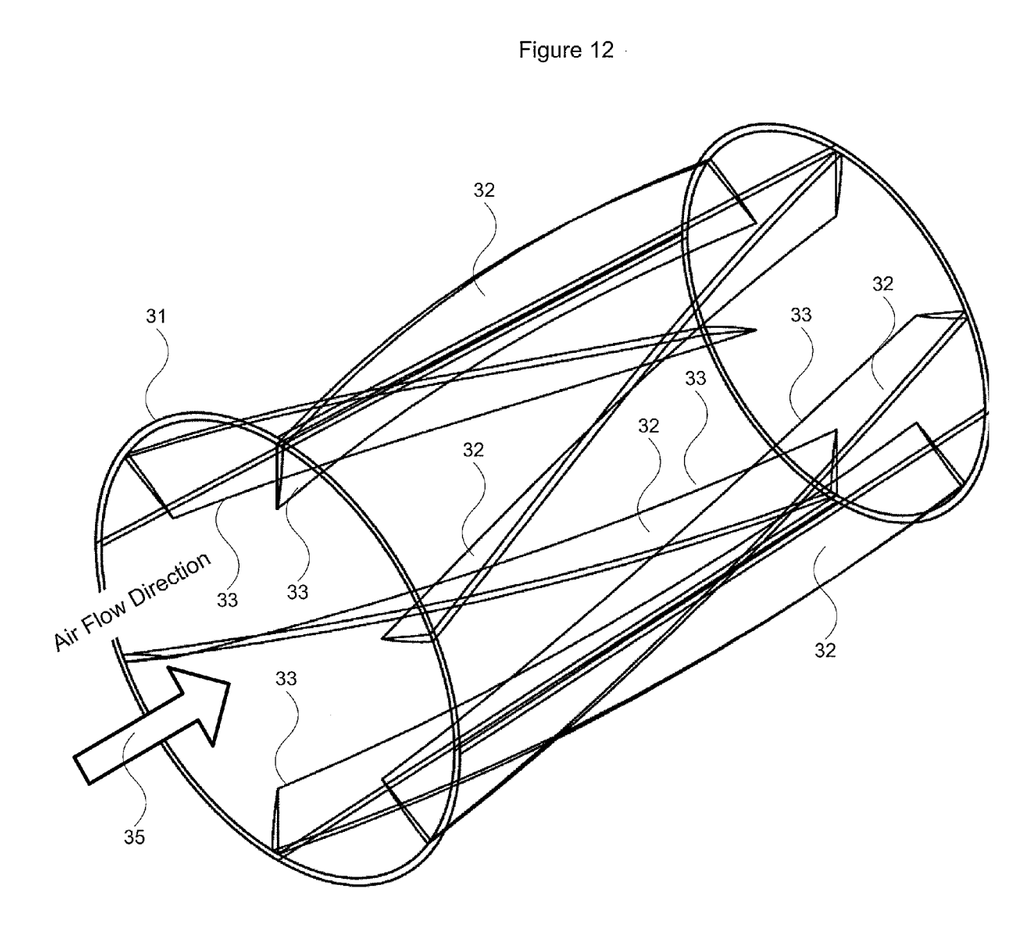
FIG. 12 is a wire frame perspective view of the device of FIG. 10.
Figure 13:
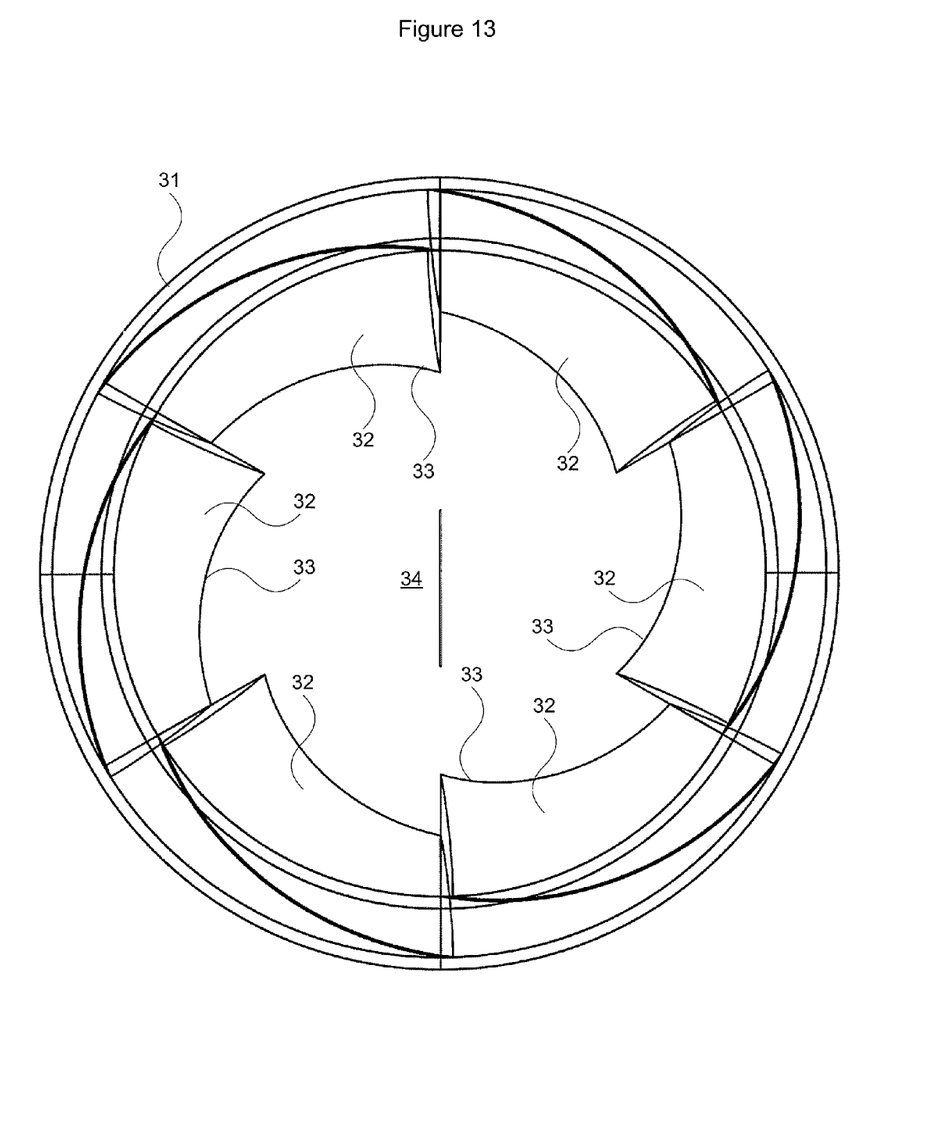
FIG. 13 is a wire frame rear view of the device of FIG. 10.

Referring to FIGS. 10 to 13, a buffed version of the first device 30 of FIG. 1 is illustrated. The top surface 33 of the fins 32 of the first device 30 are buffed such that the edge 33 that is most distal from the inner wall of the first device 10 is thinner relative to the rest of the fin 32. This ensures the creation of a low pressure vortex in the center 34 of the first device 10 which causes more air to pass through the first device 10 and into the engine. The airflow direction 35 through the buffed version of the first device 10 is indicated on FIG. 12.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A system for improving the efficiency of an internal combustion engine of a vehicle, the system comprising:
   a first non-rotating device positioned within an air intake manifold upstream from a throttle chamber of the engine; and
   a second non-rotating device positioned within an exhaust manifold of the vehicle;
   wherein the first and second devices include:
      a tubular housing having an entrance end portion and an exit end portion, the housing being of a size to direct the flow of air through the air intake manifold or the exhaust manifold from the entrance end portion to the exit end portion;
      a plurality of longitudinal fins arranged within the housing protruding radially inward and extending from the entrance end portion towards the exit end portion, the fins being limited in their height such that a central portion of the devices is unobstructed by the fins, and the fins also having a curved profile along their length so as to generate a spiral airflow such that a differential air pressure is created to accelerate the rate of airflow through the vehicle.

2. The system according to claim 1, wherein the entrance end portion of the first device has a larger cross sectional area than the exit end portion.

3. The system according to claim 1, wherein each fin is twisted into a helical shape.

4. The system according to claim 1, wherein the fins are spaced apart at 60° from each other.

5. The system according to claim 1, wherein there are six fins within each device.

6. The system according to claim 1, wherein a top edge of each fin of the first device is a thinner portion of the fin for generating a low pressure vortex in the center of the first device.

7. The system according to claim 1, wherein the fins are magnetised.

8. The system according to claim 1, wherein the second device comprises a split pin to secure the second device to the exhaust manifold.

9. The system according to claim 1, further comprising multiple second devices positioned within the exhaust manifold.

10. The system according to claim 1, wherein the fins extend the entire length of the housing from the entrance end portion to the exit end portion.

11. A method for improving the efficiency of an internal combustion engine of a vehicle, the method comprising:
   positioning a first non-rotating device within an air intake manifold upstream from a throttle chamber of the engine;
   positioning a second non-rotating device within an exhaust manifold of the vehicle;
   engaging the first and second devices to the inner surface of the air intake manifold and exhaust manifold, respectively; and
   generating a spiral airflow using fins within the devices that protrude radially inward, that are limited in height such that a central portion of the devices is unobstructed, and that are curved along their length such that a differential air pressure is created to accelerate the rate of airflow through the vehicle.

12. The method according to claim 11, further comprising buffing a top edge of each fin of the first device to be a thinner portion of the fin for generating a low pressure vortex in the center of the first device.

13. A kit for improving the efficiency of an internal combustion engine of a vehicle, the kit comprising:
   a first non-rotating device to be positioned within an air intake manifold upstream from a throttle chamber of the engine; and
   a second non-rotating device to be positioned within an exhaust manifold of the vehicle;
   wherein the first and second devices include:
      a tubular housing having an entrance end portion and an exit end portion, the housing being of a size to direct the flow of air through the air intake manifold or the exhaust manifold from the entrance end portion to the exit end portion;
      a plurality of longitudinal fins arranged within the housing protruding radially inward and extending from the entrance end portion towards the exit end portion, the fins being limited in their height such that a central portion of the device is unobstructed by the fins, and the fins also having a curved profile along their length to generate a spiral airflow such that a differential air pressure is created to accelerate the rate of airflow through the vehicle.

* * * * *